May 22, 1934.    E. WANAMAKER    1,959,972
PULLEY
Filed Aug. 27, 1931    2 Sheets-Sheet 2
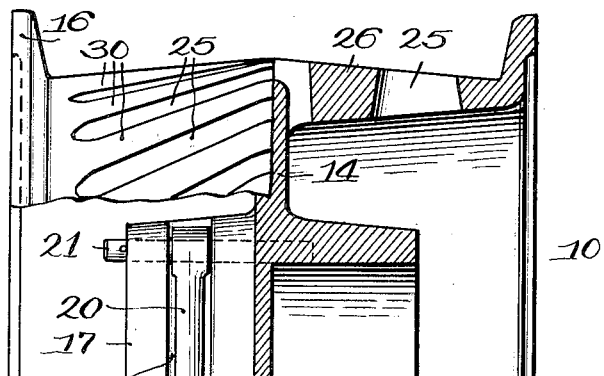
Fig.3
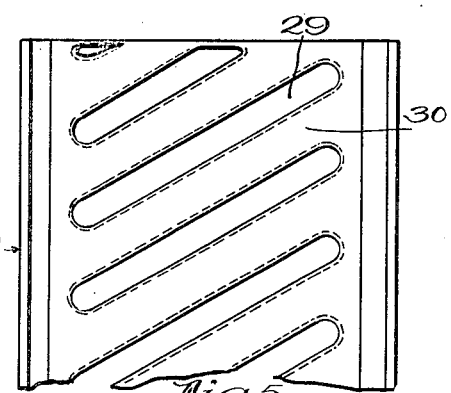
Fig.5
Fig.6
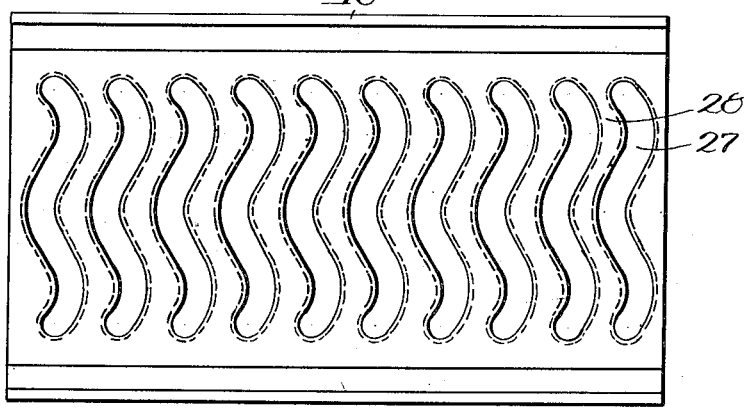
Fig.4
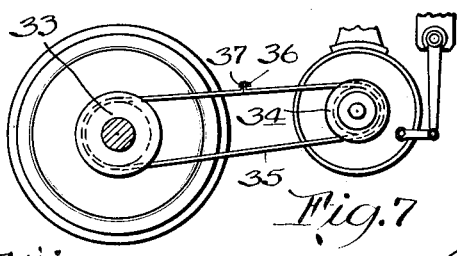
Fig.7
Witness:
Inventor,
Ernest Wanamaker,
George Beymer Jones, Atty.

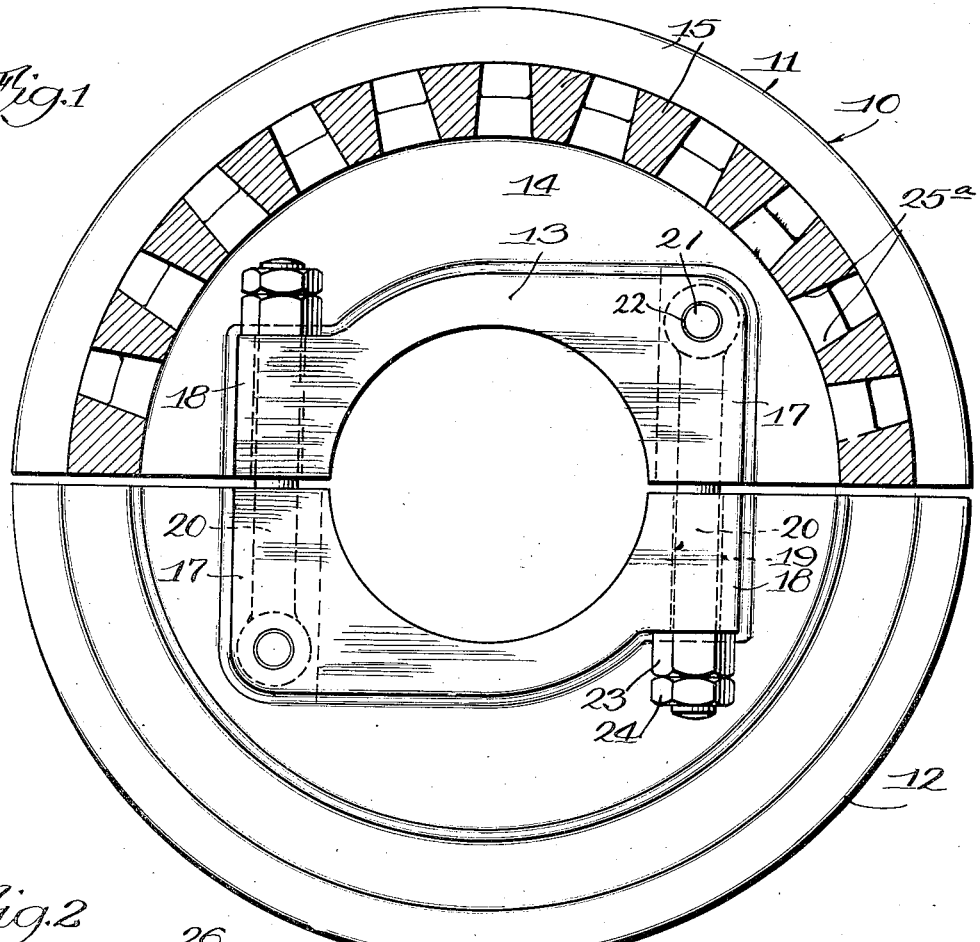
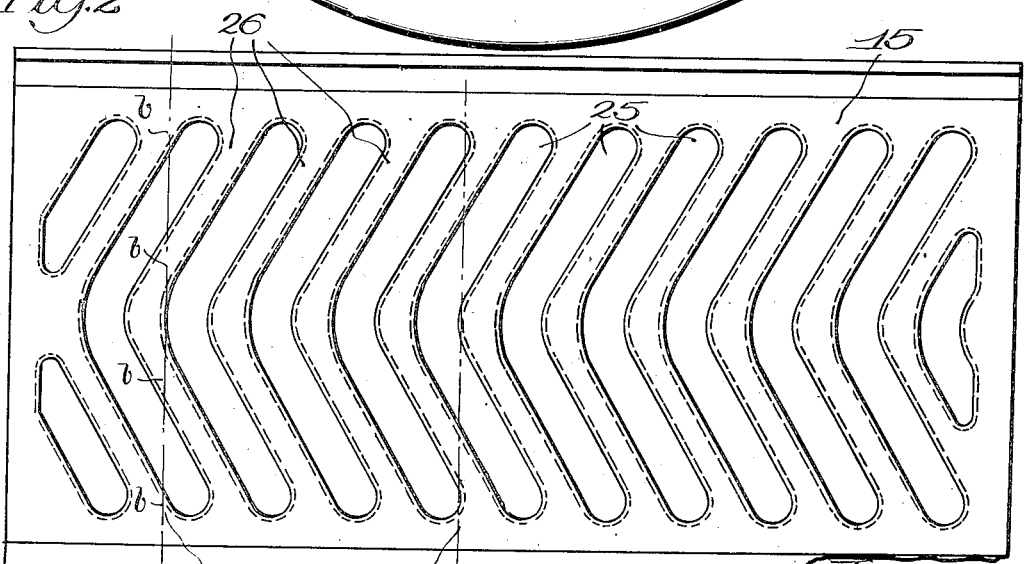

Patented May 22, 1934

1,959,972

UNITED STATES PATENT OFFICE 1,959,972

PULLEY

Ernest Wanamaker, Chicago, Ill.

Application August 27, 1931, Serial No. 559,725

4 Claims. (Cl. 64—17)

This invention relates to improvements in pulleys.

One object of the invention is to provide a pulley, the face of which is formed to reduce belt slippage and to lessen the accumulation of foreign matter on the face of the pulley and on the driving surface of the belt. The invention, while not limited to use in conjunction with belt driven car lighting generators, is especially adapted for use in that connection in that the pulley prevents or at least greatly lessens the accumulation of snow and ice on the pulley face and on the inner surface of the belt. The construction of the pulley face also is effective in preventing grit, cinders and other foreign matter becoming imbedded in the driving surface of the belt, which as is well known, results in belt slippage and excessive wear on both belts and pulleys. The construction of the face of the improved pulley also effects an increase in the contact pressure of the belt and pulley per square unit of contact area as compared with a conventional pulley without increase of belt tension, whereby slippage of the belt on the pulley is substantially lessened. One cause of belt slippage with ordinary pulleys is the entrapment of air between the belt and pulley face, but with the present improvements this air cushioning effect between the belt and pulley is eliminated.

Other objects and advantages of the present improvements will be apparent from a consideration of the following specification and accompanying drawings, wherein:

Fig. 1 is a side elevation of a pulley embodying the present improvements, the upper half of a pulley face being shown in section;

Fig. 2 is a development showing the face of one section of a two part or split pulley;

Fig. 3 is a view of the pulley looking in the direction of the pulley face, parts being shown in section;

Fig. 4 is a development of a pulley face of slightly modified construction;

Figs. 5 and 6 are developments of additional modifications; and

Fig. 7 is a view illustrating a belt driven car lighting generator embodying both an axle pulley and a generator pulley, either or both of which may be constructed in accordance with the present improvements.

In Fig. 1 the pulley is indicated generally by the numeral 10 and in the form shown comprises two sections 11 and 12, which construction admits of securing a pulley on the axle of a railway car truck without removing a wheel. The sections 11 and 12 are identical and may be of cast metal suitably finished to proper size and balance. Each section of the pulley is provided with a hub portion 13, a web 14, a face 15 and flanges 16. The sections 11 and 12 as shown in Fig. 1 each has a portion 17 offset from the hub 13. Each section likewise has another offset portion 18, each of which is complemental to a portion 17 of the other section of the pulley. As will be understood, each section has similar members 17 and 18 on the opposite side of the web 14.

As shown in Fig. 3, the portions 17 and 18 are provided with aligning slots 19, through which extends eye bolts 20. A pin 21 extends through an opening 22 in the two members 17 of each section of the pulley and through the bolts 20. The opposite end of each bolt 20 is provided with a nut 23 and preferably a lock nut 24 for securing the two sections 11 and 12 in position upon a car axle or shaft at the place of use. Bushings may be used with the pulleys if desired, none, however, being shown.

As shown in Fig. 2, each face 15 of each section is provided with a plurality of openings, which preferably are in the form of circumferentially spaced slots 25. These slots preferably extend through the face and each comprises two portions inclined to the medium line of the pulley face and meeting at said line, forming an obtuse angle. In the form illustrated, each portion of the slots 25 forms an angle of about 30° to an element of the face. The slots 25 thus define belt contacting areas or bars 26 which constitute the belt contacting face of the pulley. If a belt arranged on such a pulley has a given tension, it will contact with the bars 26 with higher pressure per square unit of area, as compared with a continuous face pulley, due to the fact that the belt contacts with a smaller area of the pulley face.

This arrangement causes portions of the belt overlying the slots 25 to bulge slightly into the slots and giving the edges of the bars 25 a firmer grip upon the belt and thus reducing belt slippage. It will also be seen that if snow or ice collects on a belt, for instance, while a car is standing still, or otherwise, the passage of the belt around the improved pulley will result in loosening the ice and causing parts of it to pass through the slots 25. A few revolutions of the belt around the pulley will result in the belt being freed from the accumulation of ice or snow, and to be kept free from such accumulations during service.

During the passage of a railway car along the track, grit in the form of cinders, sand and small pieces of ballast frequently are thrown against the driving face of the belt and carried around the pulley. The slotted construction of the face of the improved pulley permits these particles of foreign matter to be liberated immediately through the slots in the face of the pulley. While it is conceivable that such particles might be initially held between one of the bars and the belt and thus become partially imbedded in the belt, on the next passage of such particles to the same or to the other pulley they will have a chance to be dislodged through one of the slots in the pulley face.

To prevent the slots 25 becoming filled with ice, snow or the like, the walls 25ª of said slots flare inwardly as clearly shown in Fig. 1. As shown in Fig. 3, the inner surface of the pulley face at each side of the web 14, flares outwardly, thereby causing foreign matter which passes through the slots 25 to be thrown from the interior of the pulley. The hub 13 may be tapered, as shown in Fig. 3, to assist in freeing the interior of the pulley from foreign matter.

The disposition of the slots at angles, in addition to providing bars with longer edge areas and thus assuring better contact with the belt, is also of advantage in that the slotted face does not weaken the belt at the fastener. Belt fasteners are generally arranged directly across the belt, and as will be apparent from Fig. 2, abutting ends of the belt where the same are fastened together, will always be supported by at least two portions of the angularly disposed bars 26. Thus it will be impossible for the end of a belt adjacent the fastener to curl into a slot and become positively engaged with the forward edge of one of the cross bars 26 and excessive stresses imposed on the belt such as might tear it from the fastener. In Fig. 2, transverse dash line A indicates an end of a belt in one extreme position showing that the end crosses the bar 26 at its left two times intermediate the corners of the belt. Line B illustrates another position of the belt end in which it is supported at four places b, b, b, b, on the slotted area of the pulley face. Where the abutting ends of the belt are fastened together as previously stated, a thin metal plate overlies the abutting ends and is riveted to each of said ends or as hereinafter described in connection with Fig. 7, which illustrates another form.

In Fig. 4 a modified form of a pulley face is shown, in which the slots 27 and also the bars 28 are given a W or double V instead of a V shape as in Fig. 2. The advantages of the form shown in Fig. 2 are likewise obtained by this modified form. In the form shown in Fig. 5 the slots 29 are obliquely or diagonally disposed throughout their length, thus defining the correspondingly arranged belt contacting areas or bars 30.

In Fig. 6, slots 31 are curved to provide curved bars or areas 32. The degree of curvature preferably is such that the ends of a belt will be supported by at least two areas as in the other forms to prevent an end of the belt from curling into a slot 31 and thus being positively engaged by the approaching edge of an adjacent bar 32. In these modified forms of the pulley face the slots preferably flare inwardly as described with reference to the form shown in Figs. 1 to 3.

Fig. 7 illustrates a generator suspension for a railway car lighting system having the axle pulley 33 and the generator pulley 34 each of which may be of one of the improved forms above described. The belt 35 has its ends turned upwardly and clamped together by bolts 36 which pass through strips of metal 37, one on each side of a belt end, as shown in Fig. 7. In the first form of fastening referred to above, there would be a possibility that the end of the belt would be torn from the clamp were the grooves at right angles of the belt, and in the second form there is the danger of wearing off the belt at the point where it makes a right angle turn.

I claim:

1. A pulley comprising a hub, a centrally located web thereon, and a face member supported thereby, said face member having an outwardly flaring inner surface and a plurality of inwardly flaring openings extending from the belt contacting surface of said face to said inner flaring surface and to said web.

2. A pulley comprising a hub, an outwardly extending flange thereon, and a face member integral therewith, said face member having an outwardly flaring inner surface and a plurality of flaring slots defining belt contacting bars which are wider at the outer sides than at the inner sides thereof, said bars being formed with a slight angle at the center thereof and being thicker at said centers than at their extremities, to provide a crowned surface for said pulley.

3. A pulley comprising a hub, a centrally located web integral with said hub and extending outwardly from the same, a series of spaced transverse bars at the periphery of said web and united therewith at their inner surfaces, the outer surfaces thereof being crowned to form the face of a pulley, and outwardly extending flanges at the ends of said transverse bars integrally uniting the same and supported wholly thereby, forming a slotted drum, the inner diameter thereof increasing from said central web outwardly in both directions and the openings between said bars flaring inwardly, said bars forming angles with respect to the planes of said flanges.

4. A metal pulley for axle light railway equipment, comprising a circular series of spaced V shaped bars decreasing in thickness from the center to the ends thereof, a circular web integrally united to the under sides of said bars at their centers to maintain the spacing thereof and an outwardly projecting flange at each end of said bars integral therewith, the slots between said bars increasing in width from the outside to the inside thereof to prevent snow and other foreign material from packing in said slots.

ERNEST WANAMAKER.